United States Patent [19]

Scheier et al.

[11] 4,136,421
[45] Jan. 30, 1979

[54] METHOD AND APPARATUS FOR OPENING THE BODY CAVITY OF POULTRY

[75] Inventors: Donald J. Scheier, Kansas City; Henry E. Frederick, Parkville, both of Mo.

[73] Assignee: Gordon Johnson Company, Kansas City, Mo.

[21] Appl. No.: 835,671

[22] Filed: Sep. 22, 1977

[51] Int. Cl.² ............... A22C 25/18; A22C 21/00
[52] U.S. Cl. .................................... 17/52; 17/11
[58] Field of Search .......................... 17/11, 45, 52

[56] References Cited

U.S. PATENT DOCUMENTS

| 3,958,302 | 5/1976 | Meyn | 17/11 |
| 4,059,868 | 11/1977 | Meyn | 17/11 |

Primary Examiner—Harrison L. Hinson
Attorney, Agent, or Firm—Schmidt, Johnson, Hovey & Williams

[57] ABSTRACT

A knife is carried in a protective holder that permits only limited exposure of the cutting edge. Initially, the knife swings through an arc with its cutting edge trailing as the bird is simultaneously swung in a direction to cause a previously prepared hole at the vent of the bird to intersect and receive the knife during the latter's movement. With the knife thus inserted into the hole, the bird is then held against further movement with the knife and the latter is suddenly flipped outwardly and upwardly so as to slit the skin between the hole and the keel bone, thereby preparing an enlarged opening to the body cavity that will permit the subsequent entry of an eviscerating tool.

20 Claims, 11 Drawing Figures

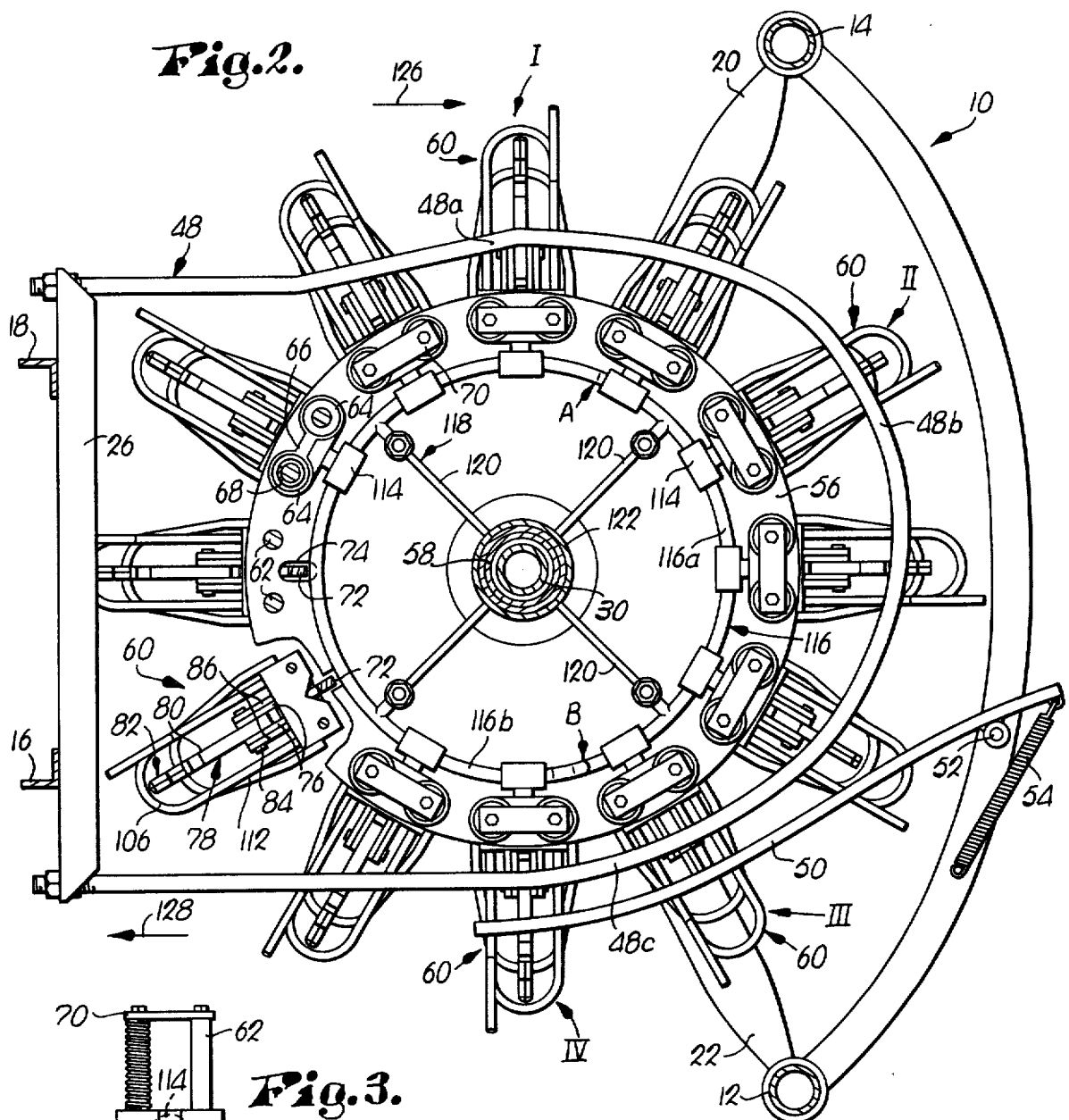
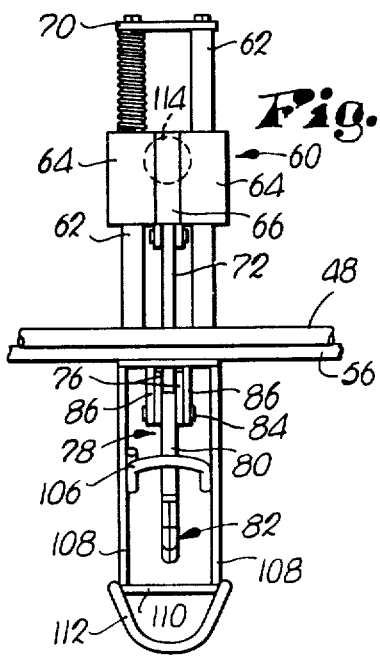
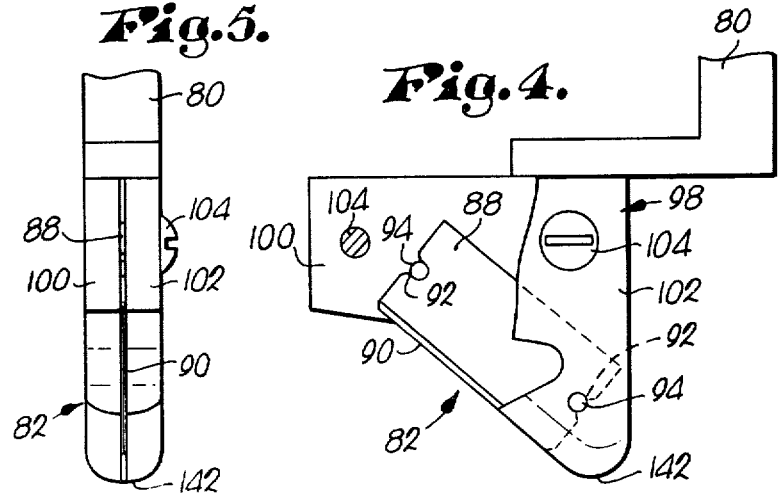

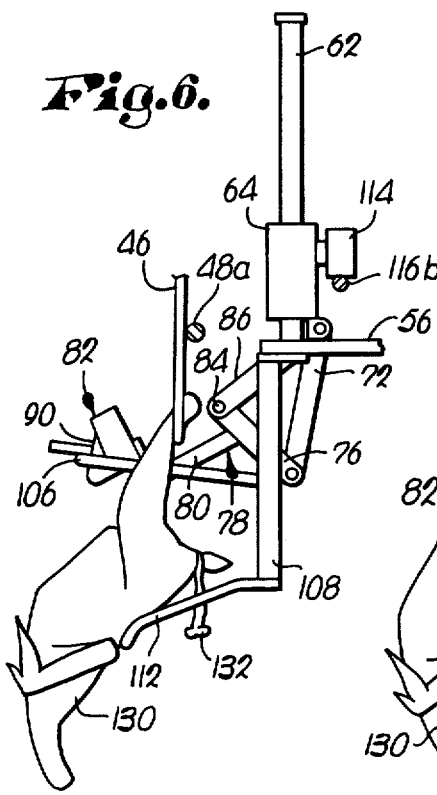
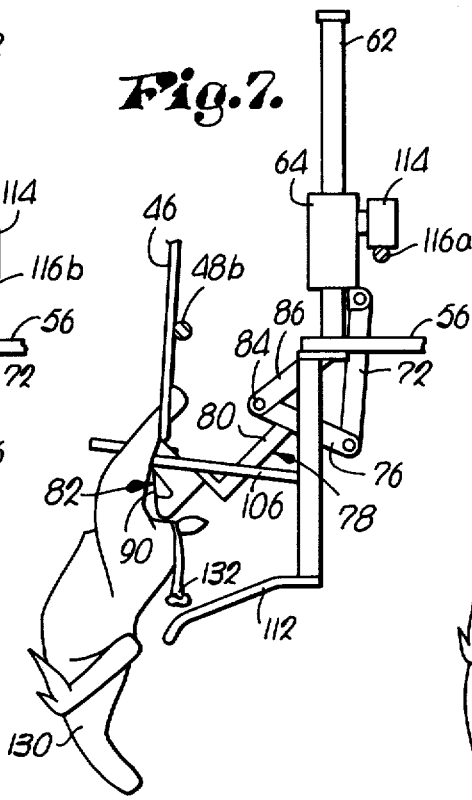
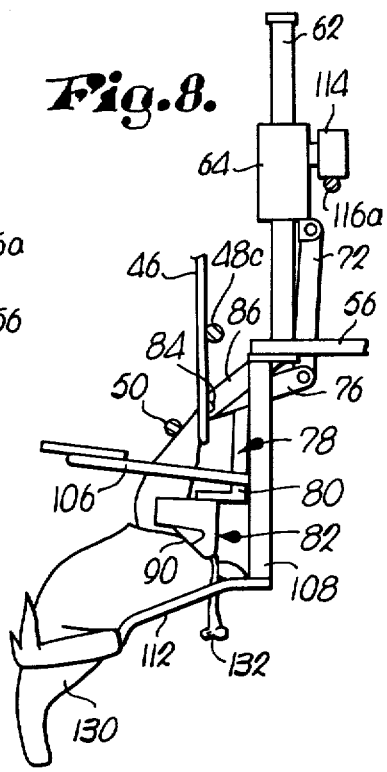
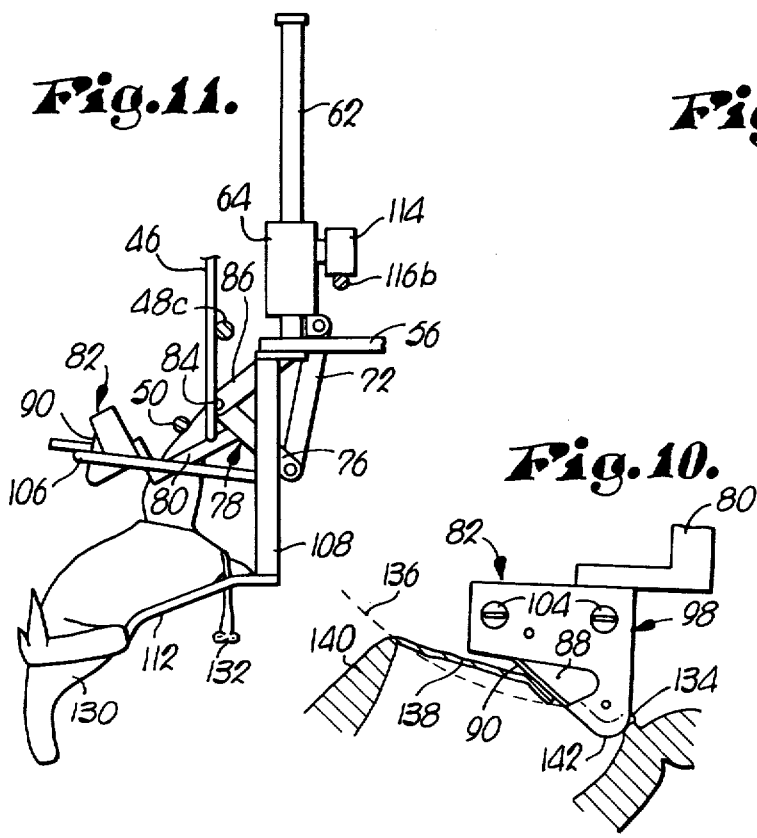
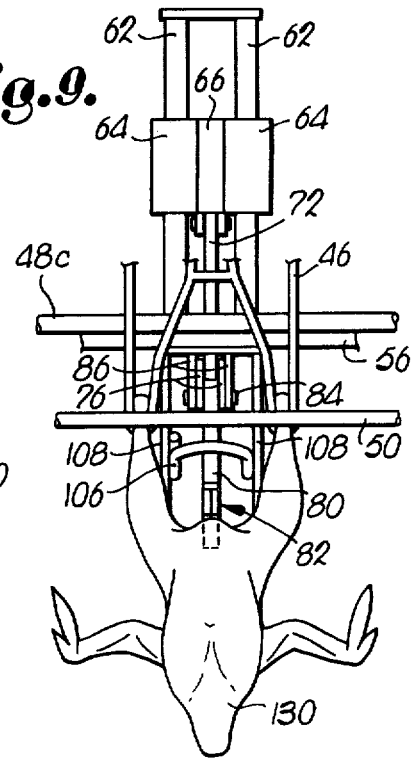

METHOD AND APPARATUS FOR OPENING THE BODY CAVITY OF POULTRY

This invention relates to the preparation of poultry carcasses for human consumption and, more particularly, relates to that stage of the process following the initial cut around the vent of a bird for the purpose of removing the latter and leaving an entry hole to the body cavity. It is desirable, however, to make the dimensions of such initial cut as small as possible so that the "plug" of material removed contains only a minimal amount of edible meat. On the other hand, it is necessary to thereafter enlarge this entryway into the cavity because its dimensions are too small to permit the entry of a tool for removing the viscera within the cavity. Consequently, it has long been the practice to manually slit the skin between the vent hole and the keel bone of the bird so as to provide an opening of the requisite dimensions without sacrificing edible portions of the bird.

Various efforts have been made to automate this enlarging or "opening" step, but none has heretofore been entirely successful for a number of reasons. Included among these is the fact that many prior opening mechanisms have simply been unduly complicated. Additionally, many have been unable to satisfactorily make the opening cut without also puncturing or otherwise unintentionally damaging the organs disposed closely between the skin intended to be severed. The latter type of mishap results in spewing contaminated fluids over the otherwise edible portions of the bird to the end that the entire bird may be unfit for consumption.

Accordingly, it is an important object of the present invention to provide a method and apparatus that prepare an enlarged opening to the body cavity of a bird in a way that mechanical reliability, cleanup ease and low cost are achieved without sacrificing the quality of the product being processed.

Pursuant to the foregoing, it is an important object of this invention to provide a shielded knife that effectively "backs in" to the vent hole with the shield leading and the cutting edge trailing by swinging along the skin to be slit during the initial insertion stroke, only thereafter being quickly actuated to retrace its steps and sever the skin with the leading edge of the knife. Preferably, the bird is manipulated through its own swinging movement during the insertion of the knife so that the vent hole intersects and receives the knife. This arrangement has the effect of limiting the mechanism required to operate the knife inasmuch as the latter need move along but a single path of travel, and also has the effect of guarding against accidental damage to the internal organs during the initial entry stages.

These and other important objects of the invention will be apparent from the description and claims which follow.

In the drawings:

FIG. 2 is a cross-sectional view through the apparatus taken along line 2—2 of FIG. 1;

FIG. 3 is a front elevational view of one of the several slitting units of the apparatus;

FIG. 4 is an enlarged fragmentary elevational view of a knife of one of the units, the protective casing for the knife being partially broken away to reveal details of construction;

FIG. 5 is an enlarged, fragmentary front elevational view thereof;

FIGS. 6, 7 and 8 are schematic side elevational views of one of the slitting units in operation illustrating successive steps in cocking the knife and inserting the same into the vent hole of the bird;

FIG. 9 is a front elevational view of the unit corresponding to the condition of things in FIG. 8;

FIG. 10 is an enlarged fragmentary side elevational view of the knife in a position corresponding to that of FIGS. 8 and 9 with the body cavity of the bird illustrated in cross section; and FIG. 11 is a side elevational view comparable to FIGS. 6, 7 and 8, but showing the knife immediately following its slitting stroke.

Figure 1:
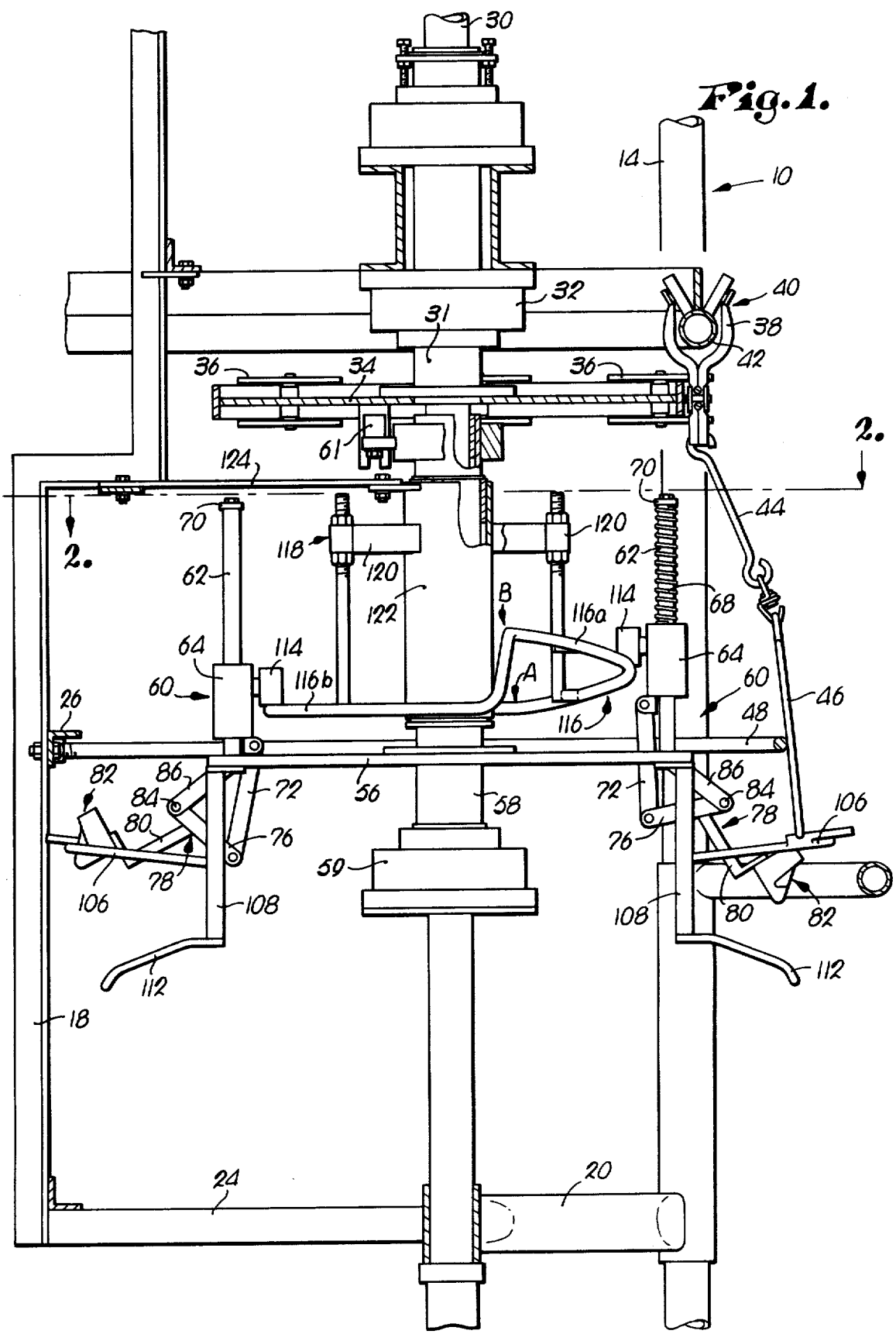
FIG. 1 is a fragmentary elevational view, partially in cross section, of apparatus constructed in accordance with the principles of the present invention and capable of carrying out our novel method.

| Prior References Of Possible Relevance | |
|---|---|
| Dutch Application (Filed Nov. 25, 1975) | 751 37 67 |
| Jansen | 1,943,077 |
| Dahlberg | 2,795,815 |
| Griffin | 1,986,195 |
| Meyn | 3,958,302 |
| Dahlberg | 2,766,477 |
| Sindler, et al | 3,778,867 |
| Swanson | 2,310,881 |
| Blacker | 3,837,045 |
| Sindler, et al | 3,927,440 |
| Barefield | 3,616,488 |
| Chamberlain | 3,417,424 |

As illustrated primarily in FIGS. 1 and 2, the apparatus includes a frame 10 consisting, among other things, of uprights 12 and 14, vertically extending angle members 16 and 18, and various horizontal braces such as 20, 22, 24, and 26 that rigidify the frame 10. In the illustrated arrangement, uprights 12 and 14 are ground-engaging while angle members 16 and 18 are not, thereby requiring that members 16 and 18 be secured to some overhead support or the like so as to stabilize the frame 10. The particular design of the frame 10, of course, has little direct bearing on the principles of the present invention.

A central upright stationary structural pipe 30 extends the full height of the frame 10 and is surrounded adjacent its upper end by a sleeve 31 that is rotatable within a bearing 32 which remains stationary with pipe 30. Sleeve 31 is then affixed to an impulse wheel 34 so that the wheel 34 and the sleeve 31 may rotate together about the upright longitudinal axis of the pipe 30. The wheel 34 is provided with a number of circumferentially spaced retaining devices 36 at its outer periphery between which are received depending trolleys 38 of a bird conveyor 40. The trolleys 38 ride along an overhead track 42 and are powered by means not illustrated so that advancement of the conveyor 40 transmits driving power to the wheel 34 through the retaining devices 36 to rotate the wheel 34 at the same revolutions per minute as the conveyor 40. The track 42 of the conveyor 40 encircles the machine through approximately 270° thereof.

Each of the trolleys 38 carries a suspended link 44 which in turn swingably supports a shackle 46. The particular construction of shackle 46 is well-known to those skilled in the art and will not be described further herein. Suffice it to point out that a bird is suspended from the shackle 46 by its hocks in the manner illustrated, for example, in FIGS. 6–9 and 11. A guide bar 48, disposed in a horizontal plane and looped around the machine in a generally U-shaped configuration as illustrated in FIG. 2, is formed to have various portions thereof disposed at certain selected radial distances from the axis of pipe 30 so as to engage the inner sides of the shackles 46 during their advancement and displace the same radially inwardly or outwardly as the case may be. A slightly reversely curved rod 50 as illustrated in FIG. 2 extends along a generally terminal stretch of the bar 48 at a position slightly below and radially outwardly of the latter as illustrated in FIGS. 8 and 11. The rod 50 is pivoted to the frame 10 at 52 for horizontal swinging movement toward and away from the bar 48 under the yieldable influence of a coil spring 54 that biases the rod 50 toward the bar 48.

Substantially midway down the central axis of the apparatus, there is a plate 56 that is secured to a second lower sleeve 58 which surrounds the pipe 30 in the same manner as the upper sleeve 31. The lower sleeve 58 is supported for rotation by a lower bearing 59 that is stationary with the pipe 30 in the same manner as the upper bearing 32, and the upper end of lower sleeve 58 is connected to the underside of wheel 34 by fastening means 61 to receive driving power therefrom and thereby cause rotation of the plate 56 with the wheel 34. Twelve slitting units, each broadly denoted by the numeral 60, are circumferentially spaced about the periphery of the plate 56 for rotation with the latter, the units 60 being identical to one another in construction and operation.

Each of the units 60 includes a pair of upright posts 62 spaced apart slightly in a circumferential direction and rigidly affixed at their lower ends to the plate 56. A pair of sleeves 64, which may be tied together by a bridge 66, are slidably carried by respective ones of the posts 62 for rectilinear movement up and down the latter. One or more coil springs 68 encircling the posts 62 between the sleeves 64 and a stop 70 across the tops of the posts 62 yieldably bias the sleeves 64 downwardly toward the plate 56.

The sleeves 64 of each unit 60 are pivotally attached at their lower ends to a common link 72 that extends downwardly through an aperture 74 (FIG. 2) in the plate 56 for pivotal connection below the latter with one arm 76 of a bell crank 78. The other arm 80 of the bell crank 78 carries a knife 82, and the bell crank 78 is pivotally supported for inward and outward swinging movement about a pivot 84 by a pair of laterally spaced arms 86, depending diagonally from the plate 56 and rigidly affixed to the latter against movement relative thereto.

As illustrated in FIGS. 4 and 5, the knife 82 includes a blade 88 having a rectilinear cutting edge 90. The blade 88 has a pair of locating notches 92 at its opposite ends which receive locating pins 94 so as to position the cutting edge 90 diagonally across a notch 96 in the protective casing 98 that houses the blade 88. For the sake of convenience, the casing 98 may be constructed in two halves, comprising one half 100 that is fixed to the arm 80 and a second half 102 which may be held against the first half 100 by screws 104, thereby releasably clamping the blade 88 in place.

The arm 80 of bell crank 78 projects downwardly through a generally horizontally extending loop 106 which is rigidly attached at its inner end to a pair of depending struts 108. The struts 108 are spaced apart slightly in a circumferential direction with respect to the circular plate 56 so as to receive therebetween the arm 76 of the bell crank 78, and the struts 108 are rigidly secured to the plate 56 for rotation with the latter. A bar 110 interconnects the struts 108 across their lower ends, and at that location a slightly downwardly and outwardly extending shelf 112 is located, the shelf 112 being in the form of a generally U-shaped, open loop having its innermost ends rigidly affixed to the lower ends of struts 108.

Each pair of sleeves 64 carries a radially inwardly disposed common roller 114 that serves as a cam follower for a cam track 116 in the nature of a rod looped around the central axis of the apparatus. While the track 116 is circular in plan as viewed in FIG. 2 and is disposed concentrically with respect to the axis of pipe 30, it has portions thereof that rise and fall so as to control the vertical position of the sleeves 64 and hence the in-and-out position of the knife 82 of each unit 60. To this end, the track 116 includes a stretch 116a that, beginning at point A, rises gradually yet steadily for approximately 135° of the track 116 until point B is reached where it suddenly drops down to a second stretch 116b which continues at the same level throughout the remaining 225°. A spider 118 having a plurality of supporting legs 120 attaches the track 116 to a stationary cylinder 122 concentrically disposed about the axis of pipe 30, but immobile relative to the latter by virtue of a connecting member 124 that joins the cylinder 122 with the frame 10.

Operation

The conveyor 40 moves in a clockwise direction about the apparatus 10 as FIG. 2 is viewed and thus drives the interconnected wheel 34 and plate 56 in the same clockwise direction through impingement of the trolleys 38 against the retaining devices 36 of the impulse wheel 34. This also results in the slitting units 60 being carried around the axis of pipe 30 in registration with respective ones of the trolleys 38.

Thus, as the suspended birds approach the revolving mechanism in the direction of the arrow 126 in FIG. 2, they are successively intercepted by the units 60 and processed thereby until being released on the opposite side of the mechanism for travel in the direction illustrated by the arrow 128. The device 60 in position I of FIG. 2 is substantially in the condition illustrated in FIG. 6 at this point in its revolution. Note in that figure that the cam follower 114 is riding along the low stretch 116b of cam track 116 and that therefore the knife 82 is disposed outwardly and upwardly to its furthest extent in what might be described as its operated position. The guide bar 48 has a relatively radially inwardly disposed stretch 48a at this location such that the shackle 46 is closer in to the axis of the upright pipe 30 than will be true in certain subsequent positions. The bird 130 is straddling the loop 106 at this time and the shelf 112 partially supports the back of the bird. Of course, the vent cut in the bird 130 has already been made, leaving a dangling plug 132 and a hole 134 which may be seen only in FIG. 10.

As the bird 130 and unit 60 progress around to point II in FIG. 2 corresponding to the condition of things in FIG. 7, the follower 114 encounters the stretch 116a of track 116 and thus begins to raise the sleeves 64, hence swinging the knife 82 downwardly and inwardly about the pivot 84 by virtue of operating link 72 and bell crank 78. Note that during this motion the "backside" of the knife 82 leads with the cutting edge 90 trailing.

Also by this time, a second stretch 48b of guide bar 48 has been encountered by the shackle 46, such second stretch 48b being disposed radially outwardly to a greater extent than stretch 48a, and thus having the tendency to slightly lift the bird 130 off the shelf 112 and bring the hole 134 closer to the knife 82.

As the bird 130 and its slitting unit 60 travel around approximately to position III of FIG. 2 corresponding to the condition of things in FIG. 8, the stretch 116a of cam track 116 raises the sleeves 64 to their fullest extent so as to swing the knife 82 downwardly and rearwardly to a position which may be termed its "cocked position." Thus, the swinging stroke of the knife 82 between the extreme positions of FIGS. 6 and 8 could be referred to as the cocking stroke for the knife 82.

At the same time that the knife 82 is swung downwardly and inwardly with the cutting edge 90 continuing to trail, the bird 130 is likewise swung inwardly and somewhat upwardly by virtue of the fact that a third stretch 48c of the bar 48 permits this type of movement on the part of the bird 130. Moreover, the spring-loaded guide rod 50 engages the legs of the bird 130 on the outside portion of the latter at this time to positively swing the bird 130 into and on top of the shelf 112, the latter having the tendency to slightly rotate the bird clockwise viewing FIG. 8.

As the knife 82 thus backs along its path of swinging travel, the bird 130 is likewise swung through an arcuate path in such a way that the hole 134 intersects and receives the knife 82 to the extent illustrated in FIGS. 8, 9 and 10 (one leg of the bird being removed in FIG. 8 for clarity). Note in this position that the cutting edge 90 is inclined forwardly with respect to the path of swinging movement 136 (FIG. 10) of the blade 88, and is thus perfectly positioned to begin the slitting stroke through the skin 138 between the hole 134 and the keel bone area 140.

Consequently, by the time the bird 130 and its slitting unit 60 have advanced to position IV of FIG. 2, the cam follower 114 will have passed point B and fallen off the stretch 116a onto the lower stretch 116b, allowing the spring 68 to quickly flip the knife 82 outwardly and upwardly along the path 136 to slit the skin 138. This swinging stroke on the part of the knife 82 may be conveniently referred to as the slitting stroke; and, as is apparent, it is carried out much more rapidly than the cocking stroke during which the follower 118 gradually rides up the sloping cam stretch 116a. The pressure of spring-loaded retaining rod 50 is maintained during the slitting stroke of the knife 82 so as to assist in preventing movement of the bird 130 with the knife 82 during the latter's slitting stroke. Beyond position IV, the conveyor 40 departs from the apparatus and the bird 130 is thus removed from its device 60 for further processing as may be necessary or desirable.

Note that as the knife 82 backs along path 136 during its cocking stroke, the cutting edge 90 is not exposed to the skin 138 because the backside of the case 98 leads. Moreover, as the hole 134 intersects and receives the knife 82, it is the rounded lowermost tip 142 of case 98 that enters the hole 134. Thus, tip 142 is in position to push any organs that it may encounter downwardly and away from the skin 138 and the cutting edge 90 and, in any event, is in position to maintain the cutting edge 90 at a distance from such organs during the ensuing slitting stroke along path 136. Consequently, the risk of puncturing or severing the organs so as to release contaminated fluids is minimized.

Furthermore, it should be noted that the apparatus of the present invention accomplishes a cut of the desired characteristics with a relatively uncomplicated mechanism. Note in this regard that only one cam and follower (track 116 and roller 114) is necessary to accomplish both insertion of the knife 82 and slitting. This is in distinct contrast to certain other arrangements which require not only one cam system to raise and lower a knife for insertion and removal, but also a second cam system for operating the knife through a slitting cut. Consequently, machine reliability and ease of sanitary cleanup are maximized while costs and maintenance requirements are reduced.

Having thus described the invention, what is claimed as new and desired to be secured by Letters Patent is:

1. In apparatus for making a slit between a hole at the vent of a bird and its keel bone so as to provide an enlarged opening to the body cavity, the improvement comprising:
   a knife swingable between a cocked position and an operated position and provided with a cutting edge;
   means for locating a bird such that during initial entry of the knife into the hole from the operated position outside of the hole said knife swings through a cocking stroke toward said cocked position and generally away from said keel bone with said cutting edge trailing,
   said locating means positioning the bird such that said knife swings generally toward said keel bone with said cutting edge leading as the knife is swung through a slitting stroke toward said operated position; and
   means for effecting said swinging movement of the knife.

2. In apparatus as claimed in claim 1, wherein said locating means is operable to swing the bird in such a way that the path of travel of the hole intersects the path of travel of the knife as the latter is swung toward said cocked position.

3. In apparatus as claimed in claim 2; and means for advancing the bird along a prescribed course of travel during the slitting operation.

4. In apparatus as claimed in claim 3, wherein said advancing means includes a shackle for suspending the bird as it is advanced along said course of travel, said locating means including structure engageable with said shackle to guide the same during its movement.

5. In apparatus as claimed in claim 4, wherein said locating means further includes a shelf disposed to receive and support the back of the bird as the latter is swung into position for the knife.

6. In apparatus for making a slit between a hole at the vent of a bird and its keel bone so as to provide an enlarged opening to the body cavity, the improvement comprising:
   a knife swingable between a cocked position and an operated position and provided with a cutting edge;
   means for locating a bird such that said knife swings into the hole and generally away from said keel bone with said cutting edge trailing as the knife is swung through a cocking stroke toward said cocked position,
   said locating means positioning the bird such that said knife swings generally toward said keel bone with said cutting edge leading as the knife is swung through a slitting stroke toward said operated position; and means for effecting said swinging movement of the knife, said means for effecting swinging of the knife including means for making the slitting stroke rapid relative to the cocking stroke.

7. In apparatus for making a slit between a hole at the vent of a bird and its keel bone so as to provide an enlarged opening to the body cavity, the improvement comprising:

a knife swingable between a cocked position and an operated position and provided with a cutting edge;

means for locating a bird such that said knife swings into the hole and generally away from said keel bone with said cutting edge trailing as the knife is swung through a cocking stroke toward said cocked position, said locating means positioning the bird such that said knife swings generally toward said keel bone with said cutting edge leading as the knife is swung through a slitting stroke toward said operated position; and means for effecting said swinging movement of the knife, said means for effecting swinging of the knife including means for yieldably biasing the knife toward said operated position and means for releasably holding the knife against the force of said yieldable means, said swing-effecting means further including means for suddenly releasing said holding means.

8. In apparatus as claimed in claim 7, wherein said holding means is operable to gradually swing the knife through said cocking stroke relative to said slitting stroke.

9. In apparatus as claimed in claim 1; and means for advancing the bird along a prescribed course of travel during the cocking and slitting strokes, said knife being movable in registration with the body along said course of travel, said means for effecting swinging of the knife including a stationary cam track and a cam follower guided by said track and coupled with the knife in a way to transmit motion thereto as induced by the interaction of said cam track with said follower.

10. In apparatus for making a slit between a hole at the vent of a bird and its keel bone so as to provide an enlarged opening to the body cavity, the improvement comprising:

a knife swingable between a cocked position and an operated position and provided with a cutting edge;

means for locating a bird such that said knife swings into the hole and generally away from said keel bone with said cutting edge trailing as the knife is swung through a cocking stroke toward said cocked position, said locating means positioning the bird such that said knife swings generally toward said keel bone with said cutting edge leading as the knife is swung through a slitting stroke toward said operated position, means for effecting said swinging movement of the knife; and means for advancing the bird along a prescribed course of travel during the cocking and slitting strokes, said knife being movable in registration with the body along said course of travel, said means for effecting swinging of the knife including a stationary cam track and a cam follower guided by said track and coupled with the knife in a way to transmit motion thereto as induced by the interaction of said cam track with said follower, said swing-effecting means further including means yieldably biasing the knife toward said operated position, said track gradually swinging the knife against the resistance of said yieldable means during said cocking stroke and suddenly releasing the knife for rapid swinging of the latter by said yieldable means through said slitting stroke after the knife reaches said cocked position.

11. In apparatus as claimed in claim 1, wherein said edge of the knife is rectilinear and is disposed in a forwardly inclined attitude in said cocked position with respect to the direction of knife travel during said slitting stroke.

12. In a method of making an enlarged opening to the body cavity of a bird by slitting the skin with a knife between a hole at the vent of the bird and its keel bone, the improvement comprising:

during initial entry of the knife into the hole, swinging the knife with its cutting edge trailing through a first stroke along an arcuate path of travel in a direction generally away from the keel bone but down into said hole; and then swinging the knife with its cutting edge leading through a second stroke in the opposite direction along said path of travel to effect said slitting.

13. In a method as claimed in claim 12; and the additional step of swinging the bird in a way that causes said hole to intersect and receive the knife during said first stroke.

14. In a method as claimed in claim 13; and the additional step of holding the bird against movement with the knife during said second stroke of the latter.

15. In a method of making an enlarged opening to the body cavity of a bird by slitting the skin between a hole at the vent of the bird and its keel bone, the improvement comprising:

swinging a knife with its cutting edge trailing through a first stroke along an arcuate path of travel in a direction generally away from the keel bone but down into said hole;

then swinging the knife with its cutting edge leading through a second stroke in the opposite direction along said path of travel to effect said slitting; and swinging the bird in a way that causes said hole to intersect and receive the knife during said first stroke, said second stroke being carried out rapidly with respect to said first stroke.

16. In a method of making an enlarged opening to the body cavity of a bird by slitting the skin between a hole at the vent of the bird and its keel bone, the improvement comprising:

swinging a knife with its cutting edge trailing through a first stroke along an arcuate path of travel in a direction generally away from the keel bone but down into said hole; and then swinging the knife with its cutting edge leading through a second stroke in the opposite direction along said path of travel to effect said slitting, said second stroke being carried out rapidly with respect to said first stroke.

17. In a method as claimed in claim 12, wherein said swinging steps are carried out while the bird is advancing along a prescribed path of travel.

18. In a method as claimed in claim 17; and the additional step of swinging the bird in a way that causes said hole to intersect and receive the knife during said first stroke.

19. In a method of making an enlarged opening to the body cavity of a bird by slitting the skin between a hole at the vent of the bird and its keel bone, the improvement comprising:

swinging a knife with its cutting edge trailing through a first stroke along an arcuate path of travel in a direction generally away from the keel bone but down into said hole;

then swinging the knife with its cutting edge leading through a second stroke in the opposite direction along said path of travel to effect said slitting, said swinging steps being carried out while the bird is advancing along a prescribed path of travel; and swinging the bird in a way that causes said hole to intersect and receive the knife during said first stroke, said second stroke being carried out rapidly with respect to said first stroke.

20. In a method as claimed in claim 19; and the additional step of holding the bird against movement with the knife during said second stroke of the latter.

* * * * *